No. 664,427. Patented Dec. 25, 1900.
S. B. PECK.
CONVEYING APPARATUS.
(Application filed July 28, 1900.)
(No Model.) 2 Sheets—Sheet 1.

Witnesses: Frank J. Blanchard, Homer L. Krafft

Inventor: Staunton B Peck
By Parker & Carter
Attorneys.

No. 664,427. Patented Dec. 25, 1900.
S. B. PECK.
CONVEYING APPARATUS.
(Application filed July 28, 1900.)

(No Model.) 2 Sheets—Sheet 2.

Witnesses: Frank J. Blanchard, Homer L. Kraft

Inventor: Staunton B. Peck
By Parker & Carter
Attorneys.

UNITED STATES PATENT OFFICE.

STAUNTON B. PECK, OF CHICAGO, ILLINOIS, ASSIGNOR TO THE LINK BELT MACHINERY COMPANY, OF SAME PLACE.

CONVEYING APPARATUS.

SPECIFICATION forming part of Letters Patent No. 664,427, dated December 25, 1900.

Application filed July 28, 1900. Serial No. 25,097. (No model.)

*To all whom it may concern:*

Be it known that I, STAUNTON B. PECK, a citizen of the United States, residing at Chicago, in the county of Cook and State of Illinois, have invented a certain new and useful Improvement in Conveying Apparatus, of which the following is a specification.

My invention relates to conveying apparatus, and has for its object to provide a new and improved apparatus of this description.

My invention is illustrated in the accompanying drawings, wherein—

Figure 1:
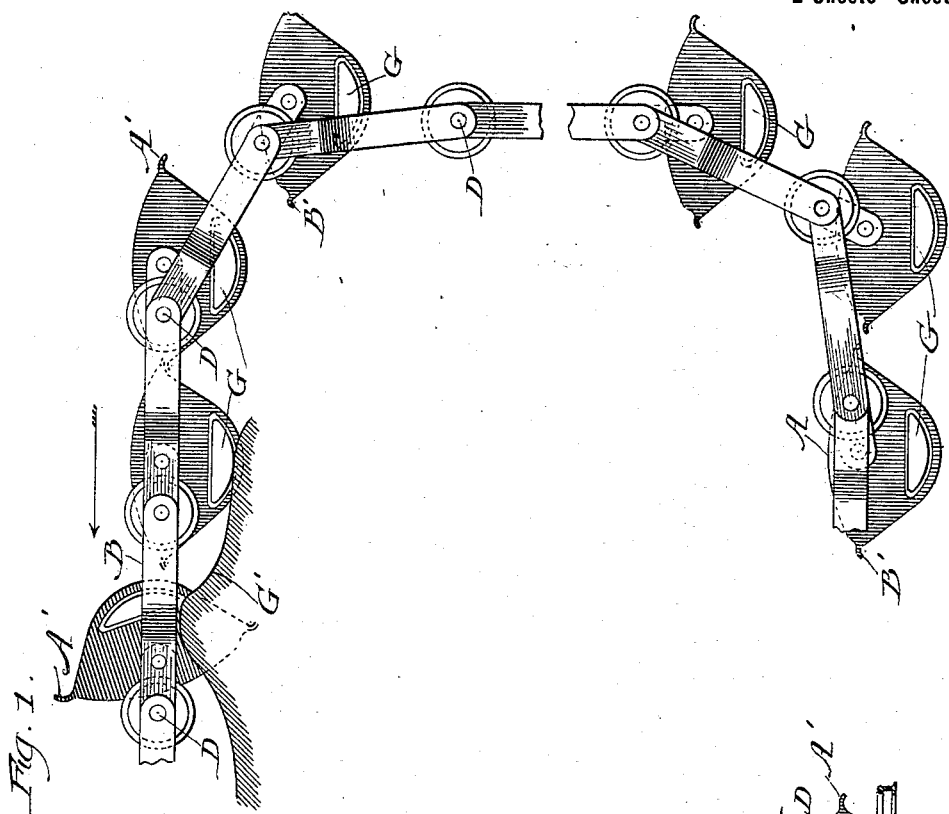
Figure 1:
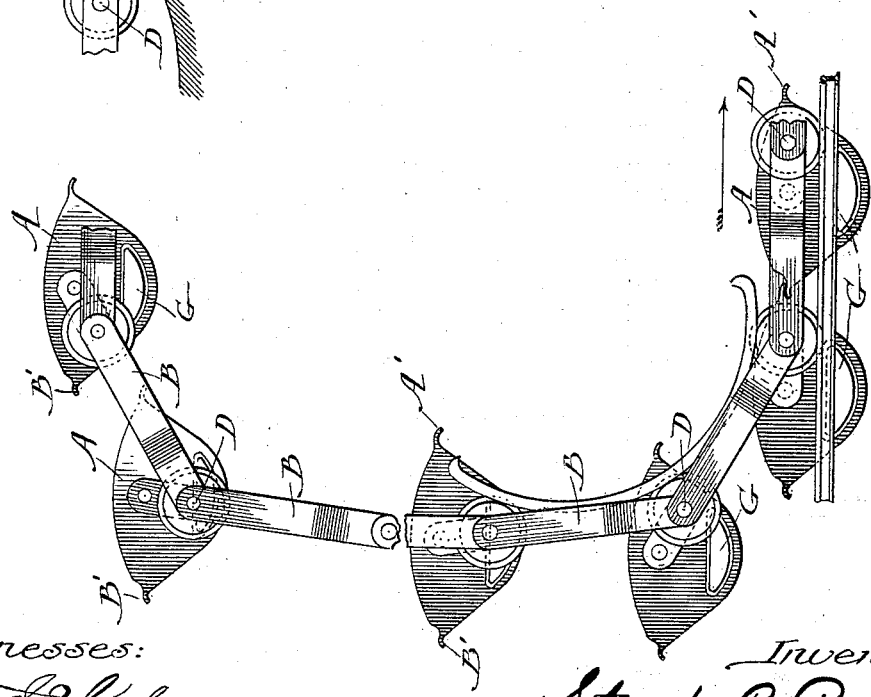
Figure 2:
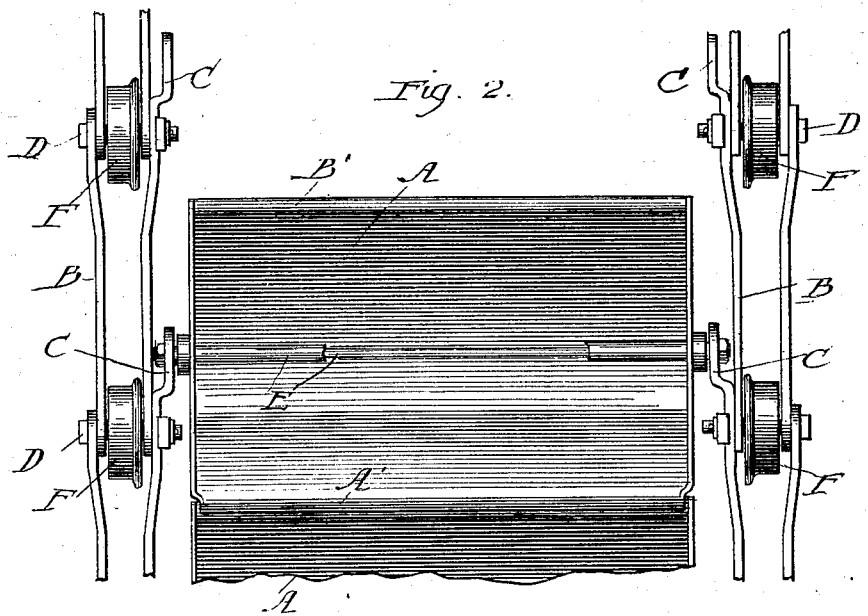
Figure 3:
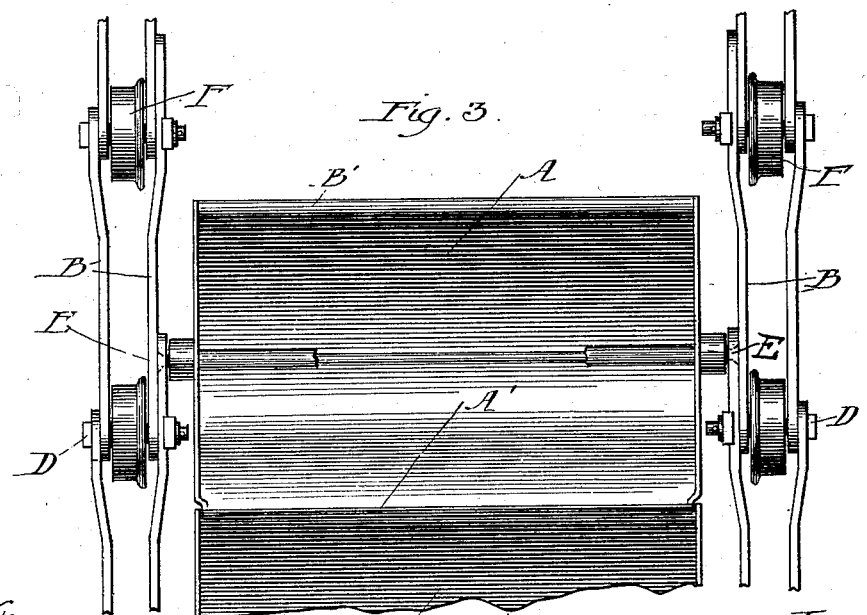

Figure 1 is a view with parts omitted, showing an endless conveying apparatus embodying my invention. Fig. 2 is a plan view of the connection between the buckets and the chain. Fig. 3 is a view similar to Fig. 2, showing a different construction.

Like letters refer to like parts throughout the several figures.

My invention is particularly adapted to be used in connection with conveyers having pivoted overlapping buckets. When such buckets are used, the overlapping devices or parts connect the edges of the buckets at the point where the buckets are filled, so as to prevent the material from falling between them. When the direction of the conveyer is changed, the overlapping edges are changed or reversed, the edge which in one position was beneath being above in the other position. It is therefore necessary to have some means for disengaging these overlapping edges at the points where the direction of the conveyer is changed. One of the objects of my invention is to provide a construction for producing this result.

I have illustrated in the drawings a conveying apparatus comprising a series of buckets A, pivotally connected with a chain or other connecting device made up of a series of parts or links B, which are also pivotally connected together, so as to form a flexible construction. Some suitable overlapping device is provided for spanning the distance or space between the edges of the buckets at the point where the buckets are loaded. Any suitable construction for this purpose may be used, and as herein shown the buckets are provided with overlapping edges A' B'. When the buckets are on the lower level, the part A' of one bucket is above the part B' of the preceding bucket. When the buckets turn the corner, the lapping of the parts is changed, so that the part B' is above the part A'. Some arrangement must therefore be provided for disengaging these overlapping parts at these points. In the construction shown in the drawings each link or connecting-piece B is provided with a projecting end or part C, which projects past the pivotal or articulating point of the link or piece B. These buckets A are connected with the projecting ends or parts C by means of suitable pivots or axes E, which are substantially in the same plane as the pivots D, which connect the links or pieces together. These pivots or axes E may be made short, or they may extend entirely across the bucket, so that one acts for the two pivotal points on opposite sides. The projecting end or part C may be slightly bent, as shown in Fig. 2, so as to facilitate the assembling of the parts, or it may be straight, as shown in Fig. 3, the ends of the pivots or axes E being provided with heads or the like, which fit in countersunk holes. At each articulating point of the chain or connecting device I preferably provide a carrying-wheel F, mounted upon the pivot D. These carrying-wheels engage suitable rails or the like upon which the conveyer is supported. I have shown in the drawings two sets of links or connecting-pieces B on each side of the bucket, the carrying-wheels being located between them. It is of course evident that this construction is not essential and that a single set of links may be used, if desired, or any other suitable construction employed. The buckets A may be provided with any suitable dumping device. As herein shown, the sides of the buckets are provided with cams G, which engage the cams G' at the point where it is desired to unload the buckets, the engagement being such that the buckets are tipped so as to be emptied.

I have shown in detail one construction embodying my invention; but it is of course evident that the form, construction, and arrangement of the parts may be greatly varied and some of the parts omitted and others used with parts not herein shown without departing from the spirit of my invention. I therefore do not limit myself to the construction shown.

In the drawings I have illustrated two distinct and separated chains, each having one set of links or connecting-pieces provided with the projecting parts which extend beyond the pivotal points, the buckets being between the two chains and being pivotally connected to two of said projecting parts, one associated with each chain.

Suitable guide and supporting rails are provided for the wheels F, which may be arranged in any desired manner. These rails have been partially omitted from the drawings, so as to more clearly bring out the construction claimed.

The use and operation of my invention are as follows: When the buckets are passing along the lower level, (shown in Fig. 1,) the overlapping edges A' and B' overlap, so as to span the space between the buckets. The buckets are preferably loaded when in this position. When the buckets turn the corners or when the direction of the conveyer is changed, as shown at the lower right-hand corner, for example, the projecting end or part C, which is a part of the link or connecting-piece B, carries the bucket connected to it downwardly and to one side, so as to disengage the two overlapping edges and separate the buckets. As the buckets move upwardly these overlapping edges are free to adjust themselves in opposite relation, so that the edge B' will be above the edge A', which is the reverse of the positions they occupy when on the lower level. When the buckets pass the upper level, the overlapping edges again engage, as shown. It will thus be seen that by providing the connecting-pieces or links with a projecting end or part which projects past the pivotal or articulating point the overlapping edges of the buckets will be disengaged at the corners, so as to leave the buckets free and permit their proper adjustment due to the change in position. This construction is durable, efficient, and cheap and is at the same time reliable and effective under all conditions.

I claim—

1. The combination, in a conveying apparatus, of links or connecting-pieces provided with pivots, by means of which they are connected in position, a projecting part or end on each link projecting past one of said pivots and in substantially the same plane with both pivots of said link, and a bucket between two of said projecting parts and pivotally connected thereto.

2. A conveying apparatus, comprising a series of links or connecting-pieces pivoted together, some of which are provided each with a projecting part, which projects past the pivotal or articulating point and in substantially the same plane with both pivots of said link, and a series of buckets provided each with a device for spanning the space between their edges, each bucket being placed between two of said projecting parts and pivotally connected thereto.

3. A conveying apparatus, comprising a series of connecting-pieces pivotally connected together, each provided with a projecting part which projects past the pivotal or articulating point and in substantially the same plane with both pivots of said connecting-piece, a series of carrying-wheels connected with said pieces at their pivotal points, and a series of buckets provided with overlapping edges, each bucket being placed between two of said projecting parts and pivotally connected with each of the projecting parts of the links or pieces upon which it is carried.

4. A conveying apparatus, comprising two separated chains made up each of a set of links or connecting-pieces pivotally connected together, one set of links or connecting-pieces associated with each chain being provided with projecting parts which project past the pivotal or articulating points and each projecting part in substantially the same plane with both pivots of its associated link, a series of buckets suspended between the chains, each bucket pivotally connected to one of said projecting parts associated with each chain, said buckets provided with overlapping edges, substantially as described.

STAUNTON B. PECK.

Witnesses:
DONALD M. CARTER,
HOMER L. KRAFT.